United States Patent
Keller et al.

(10) Patent No.: US 6,892,209 B2
(45) Date of Patent: May 10, 2005

(54) TECHNIQUE FOR DETERMINATION OF AN EXCEPTION IN MULTI-DIMENSIONAL DATA

(75) Inventors: Martin Keller, Vaihingen (DE); Dieter Roller, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 501 days.

(21) Appl. No.: 10/165,322

(22) Filed: Jun. 7, 2002

(65) Prior Publication Data

US 2003/0028546 A1 Feb. 6, 2003

(51) Int. Cl.$^7$ ................................................ G06F 7/00
(52) U.S. Cl. ........................ 707/102; 707/1; 707/103 R
(58) Field of Search ..................... 707/1–2, 100–102, 707/103 R; 715/500.1; 345/420

(56) References Cited

U.S. PATENT DOCUMENTS

| 6,094,651 A | * | 7/2000 | Agrawal et al. ............... 707/5 |
| 2004/0015906 A1 | * | 1/2004 | Goraya ....................... 717/141 |

* cited by examiner

*Primary Examiner*—Alford W. Kindred
(74) *Attorney, Agent, or Firm*—Gregory M. Doudnikoff

(57) ABSTRACT

A technique for determination of an exception in multi-dimensional data is provided. The method determines an expected value for a set of cells of the multi-dimensional data by means of an ANOVA based method. A residual for each cell of the set of cells is then determined. Scaling of the residuals is then carried out, and the scaled residuals are then compared with a threshold value for determination of the exception.

14 Claims, 5 Drawing Sheets

|    | A                         | B        | C        | D        | E        | F | G |
|----|---------------------------|----------|----------|----------|----------|---|---|
| 1  | Actual                    |          |          |          |          |   |   |
| 2  | Regular Checking          |          |          |          |          |   |   |
| 3  | Business Unit Geography   |          |          |          |          |   |   |
| 4  | Customer Relationship Age |          |          |          |          |   |   |
| 5  | $60,000 to $79,999        |          |          |          |          |   |   |
| 6  | Profit                    |          |          |          |          |   |   |
| 7  |                           |          |          |          |          |   |   |
| 8  |                           | JAN 1999 | FEB 1999 | MAR 1999 | APR 1999 |   |   |
| 9  | Less Than 18              |          |          |          |          |   |   |
| 10 | 19 to 30                  | 0        | 0        | 0        | 0        |   |   |
| 11 | 31 to 45                  | 57.41    | 7.46     | 56.14    | 23       |   |   |
| 12 | 46 to 55                  | 1.31     | 2.8      | -0.87    | 1        |   |   |
| 13 | 56 to 64                  |          |          |          |          |   |   |
| 14 | 65 And Over               | 14.72    | -1.66    | 46.23    | 0        |   |   |
| 15 |                           |          |          |          |          |   |   |
| 16 |                           |          |          |          |          |   |   |

FIG. 7

|   | A         | B       | C        | D        |
|---|-----------|---------|----------|----------|
| 1 |           | October | November | December |
| 2 | Product A | 993     | 887      | 927      |
| 3 | Product B | -801    | 756      | 847      |
| 4 | Product C | -4      | 9        | -54      |
| 5 |           |         |          |          |

FIG. 4

| | B | C | D | E | F | G | H | I |
|---|---|---|---|---|---|---|---|---|
| 10 | | | | | | | | Measures |
| 11 | Scenario | Product | Business Un | Individual Age G | Customer Rel | Customer An | TimePeriod | 0 |
| 12 | Actual | 12 Month Certificate | South | Individual Age Gro | More than 15 y | Annual Income | FEB 1999 | 19 |
| 13 | Actual | 12 Month Certificate | South | 65 and Over | More than 15 y | Annual Income | FEB 1999 | 16 |
| 14 | Actual | Advantage Checking | North | 31 to 45 | Between 5 and | $20,000 to $29 | MAR 1999 | 15 |
| 15 | Actual | 12 Month Certificate | North | 31 to 45 | Customer Rela | Customer Ann | SEP 1998 | 14 |
| 16 | Actual | 12 Month Certificate | Business Unit | 31 to 45 | Customer Rela | Annual Income | SEP 1998 | 14 |
| 17 | Actual | 12 Month Certificate | South | 65 and Over | More than 15 y | Customer Ann | FEB 1999 | 14 |
| 18 | Actual | 12 Month Certificate | North | 31 to 45 | Customer Rela | Annual Income | SEP 1998 | 14 |
| 19 | Actual | 36 Month IRA Cert | Business Unit | 31 to 45 | Customer Rela | Customer Ann | APR 1998 | 13 |
| 20 | Actual | Product | West | Individual Age Gro | Customer Rela | Annual Income | JAN 1998 | 13 |
| 21 | Actual | 12 Month Certificate | North | Individual Age Gro | Customer Rela | Under $20,000 | FEB 1998 | 13 |
| 22 | Actual | 12 Month Certificate | North | 31 to 45 | Customer Rela | Under $20,000 | FEB 1998 | 13 |
| 23 | Actual | Regular Checking | North | 65 and Over | More than 15 y | Annual Income | JAN 1999 | 13 |
| 24 | Actual | 36 Month Certificate | Business Unit | Individual Age Gro | Customer Rela | $40,000 to $59 | AUG 1998 | 12 |
| 25 | Actual | 36 Month IRA Cert | Business Unit | Individual Age Gro | Customer Rela | $30,000 to $39 | APR 1998 | 12 |
| 26 | Actual | Product | North | Individual Age Gro | Customer Rela | Annual Income | JAN 1998 | 12 |
| 27 | Actual | 36 Month IRA Cert | North | 31 to 45 | Customer Rela | Customer Ann | APR 1998 | 12 |
| 28 | Actual | Regular Checking | South | Individual Age Gro | Customer Rela | Annual Income | MAR 1999 | 12 |
| 29 | Actual | 12 Month Certificate | Business Unit | 31 to 45 | 2 to 4 years | Customer Ann | FEB 1999 | 12 |
| 30 | Actual | 12 Month Certificate | Business Unit | 31 to 45 | Between 5 And | Customer Ann | SEP 1998 | 12 |
| 31 | Actual | 36 Month Certificate | Business Unit | 46 to 55 | Customer Rela | $40,000 to $59 | AUG 1998 | 12 |
| 32 | Actual | 12 Month Certificate | Business Unit | 31 to 45 | Customer Rela | Under $20,000 | FEB 1998 | 12 |
| 33 | Actual | 12 Month Certificate | Business Unit | Individual Age Gro | Between 5 And | Under $20,000 | FEB 1998 | 12 |
| 34 | Actual | 6 Month Certificate | North | 31 to 45 | Customer Rela | Under $20,000 | FEB 1998 | 12 |
| 35 | Actual | Regular Checking | North | Individual Age Gro | Between 5 And | Under $20,000 | $30,000 to $39 | MAR 1999 | 12 |
| 36 | Actual | Regular Checking | North | Individual Age Gro | Between 5 And | Under $20,000 | MAR 1999 | 12 |
| 37 | Actual | 12 Month Certificate | Business Unit | 31 to 45 | Between 5 And | Annual Income | SEP 1998 | 12 |

FIG. 5

|   | A | B | C | D | E | F | G |
|---|---|---|---|---|---|---|---|
| 1 | Actual | | | | | | |
| 2 | Regular Checking | | | | | | |
| 3 | 31 to 45 | | | | | | |
| 4 | Between 5 and 10 Years | | | | | | |
| 5 | Under $20,000 | | | | | | |
| 6 | Profit | | | | | | |
| 7 | | | | | | | |
| 8 | | North | South | East | West | Head Office | |
| 9 | JAN 1998 | 0 | 0 | | 0 | 0 | |
| 10 | FEB 1998 | 0 | 0 | | 0 | 0 | |
| 11 | MAR 1998 | 0 | 0 | | 0 | 0 | |
| 12 | APR 1998 | 0 | 0 | | 0 | 0 | |
| 13 | MAY 1998 | 0 | 0 | | 0 | 0 | |
| 14 | JUN 1998 | 0 | 0 | | 0 | 0 | |
| 15 | JUL 1998 | 0 | 0 | | 0 | 0 | |
| 16 | AUG 1998 | 0 | 0 | | 0 | 0 | |
| 17 | SEP 1998 | 0 | 0 | | 0 | 0 | |
| 18 | OCT 1998 | -11.35 | 0 | | 0 | 0 | |
| 19 | NOV 1998 | -9.38 | 0 | | 0 | 0 | |
| 20 | DEC 1998 | 10.09 | 0 | | 0 | 0 | |
| 21 | JAN 1999 | -9.68 | 0 | | 0 | 0 | |
| 22 | FEB 1999 | -0.06 | 0 | | 0 | 0 | |
| 23 | MAR 1999 | 252.99 | 2.24 | | 0 | 3.86 | |
| 24 | APR 1999 | 20 | 0 | | 0 | 25 | |
| 25 | | | | | | | |
| 26 | | | | | | | |
| 27 | | | | | | | |
| 28 | | | | | | | |

TECHNIQUE FOR DETERMINATION OF AN EXCEPTION IN MULTI-DIMENSIONAL DATA

BACKGROUND OF THE INVENTION

1. Field of the Invention

The present invention is related to an improved data processing system. A more particular aspect of the present invention is related to the application of decision support techniques such as online analytical processing (OLAP) to databases.

2. Description of the Related Art

Decision support is rapidly becoming a key technology for business success. Decision support allows a business to deduce useful information, usually referred to as a data warehouse, from an operational database. While the operational database maintains state information, the data warehouse typically maintains historical information. Users of data warehouses are generally more interested in identifying trends rather than looking at individual records in isolation. Decision support queries are thus more computationally intensive and make heavy use of aggregation. This can result in long completion delays and unacceptable productivity constraints.

Some known techniques used to reduce delays are to pre-compute frequently asked queries, or to use sampling techniques, or both. In particular, applying online analytical processing (OLAP) techniques such as data cubes on very large relational databases or data warehouses for decision support has received increasing attention recently (see e.g., Jim Gray, Adam Bosworth, Andrew Layman, and Hamid Pirahesh, "Data Cube: A Relational Aggregation Operator Generalizing Group-By, Cross-Tab, and Sub-Totals", International Conference on Data Engineering, 1996, New Orleans, pp. 152–160) ("Gray"). Here, users typically view the historical data from data warehouses as multidimensional data cubes. Each cell (or lattice point) in the cube is a view consisting of an aggregation of interests, such as total sales.

Commonly encountered aggregation queries for data warehouse applications include those already defined in the standard Structured Query Language (SQL).

Relational DataBase Management System (RDBMS) software using a Structured Query Language (SQL) interface is well known in the art. The SQL interface has evolved into a standard language for RDBMS software and has been adopted as such by both the American National Standards Institute (ANSI) and the International Standards Organization (ISO).

RDBMS software has typically been used with databases comprised of traditional data types that are easily structured into tables. However, RDBMS products do have limitations with respect to providing users with specific views of data. Thus, "front-ends" have been developed for RDBMS products so that data retrieved from the RDBMS can be aggregated, summarized, consolidated, summed, viewed, and analyzed. However, even these "front-ends" do not easily provide the ability to consolidate, view, and analyze data in the manner of "multi-dimensional data analysis." This type of functionality relies on OLAP.

OLAP generally comprises numerous, speculative "what-if" and/or "why" data model scenarios executed by a computer. Within these scenarios, the values of key variables or parameters are hanged, often repeatedly, to reflect potential variances in measured data. Additional data is then synthesized through animation of the data model. This often includes the consolidation of projected and actual data according to more than one consolidation path or dimension.

Data consolidation is the process of synthesizing data into essential knowledge. The highest level in a data consolidation path is referred to as that data's dimension. A given data dimension represents a specific perspective of the data included in its associated consolidation path. There are typically a number of different dimensions from which a given pool of data can be analyzed. This plural perspective, or Multi-Dimensional Conceptual View, appears to be the way most business persons naturally view their enterprise. Each of these perspectives is considered to be a complementary data dimension. Simultaneous analysis of multiple data dimensions is referred to as multi-dimensional data analysis.

OLAP functionality is characterized by dynamic multi-dimensional analysis of consolidated data supporting end-user analytical and navigational activities, including:

a) calculations and modeling applied across dimensions, through hierarchies and/or across members;

b) trend analysis over sequential time periods;

c) slicing subsets for on-screen viewing;

d) drill down to deeper levels of consolidation;

e) reach through to underlying detail data; and f) rotation to new dimensional comparisons in the viewing area.

OLAP is often implemented in a multi-user client/server mode and attempts to offer consistently rapid response to database access, regardless of database size and complexity.

Corresponding OLAP database systems are known. See, for example, U.S. Pat. Nos. 6,205,447, 6,122,636, 5,978, 796, 5,978,788, and 5,940,818.

In essence, OLAP software enables users, such as analysts, managers and executives, to gain insight into performance of an enterprise through rapid access to a wide variety of data views that are organized to reflect the multidimensional nature of the enterprise performance data. An increasingly popular data model A for OLAP applications is the multidimensional database (MDDB), which is also known as the data cube. OLAP data cubes are predominantly used for interactive exploration-of performance data for finding regions of anomalies in the data, which are also referred to as exceptions or deviations. Problem areas and/or new opportunities are often identified when an anomaly is located.

To create an MDDB from a collection of data, a number of attributes associated with the data are selected. Some of the attributes are chosen to be metrics of interest and are each referred to as a "measure," while the remaining attributes are referred to as "dimensions." Dimensions usually have associated "hierarchies" that are arranged in aggregation levels providing different levels of granularity for viewing the data.

Exploration typically begins at the highest level of a dimensional hierarchy. The lower levels of hierarchies are then "drilled-down" to by looking at the aggregated values and visually identifying interesting values within the aggregated values. For example, drilling down along a product dimension from a product category to a product type may identify product types exhibiting an anomalous sales behavior. Continued drill-down from the product type may identify individual products causing the anomalous sales behavior. If exploration along a particular path does not yield interesting results, the path is "rolled-up" and another branch is examined. A roll-up may return to an intermediate level for drilling-down along another branch, or the top level of the hierarchy may be returned to and another drill-down may continue along another dimension.

Besides being cumbersome, this "hypothesis-driven" exploration for anomalies has several shortcomings. For example, the search space is usually large-a typical data cube has 5–8 dimensions with any particular dimension having hundreds of values, and each dimension having a hierarchy that is 3–8 levels high, as disclosed by George Colliat, OLAP, relational, and multidimensional database systems, Technical report, Arbor Software Corporation, Sunnyvale, Calif., 1995. Consequently, an anomaly can be hidden in any of several million values of detailed data that has been aggregated at various levels of detail. Additionally, higher level aggregations from where an analysis typically begins may not be affected by an anomaly occurring below the starting level because of cancellation effects caused by multiple exceptions or simply by the large amount of aggregated data. Even when data is viewed at the same level of detail as where an anomaly occurs, the exception might be hard to notice.

What is needed is a way for conveniently performing an exploration of a data cube that ensures that abnormal data patterns are not missed at any level of data aggregation, regardless of the number of dimensions and/or hierarchies of the data.

U.S. Pat. No. , 6,094,651 shows a "discovery-driven" approach for data exploration of a data cube where a search for anomalies is guided to interesting areas of the data by pre-mined paths that are based on exceptions found at various levels of data aggregation. Consequently, it is ensured that abnormal data patterns are not missed at any level of data aggregation, regardless of the number of dimensions and/or hierarchies of the data by providing a paradigm of pre-excavated exceptions.

Further, this provides a method for navigating large multidimensional OLAP datasets for locating exceptions, and for guiding a user to interesting regions in a data cube using pre-mined exceptions that exhibit anomalous behavior. The number of drill-downs and selection steps is significantly reduced in comparison to other conventional approaches for manually finding exceptions, especially in large data cubes having many different dimensions and hierarchies.

Data anomalies in a k dimensional data cube are identified by the steps of associating a surprise value with each cell of a data cube, and indicating a data anomaly when the surprise value associated with a cell exceeds a predetermined exception threshold.

It is an object of the invention to provide an improved method for determining an exception in multidimensional data and to provide a corresponding computer system and computer program product.

SUMMARY OF INVENTION

The object of the invention is solved by applying the features of the independent claims. Preferred embodiments of the invention are set forth in the dependent claims.

The present invention provides an efficient and accurate method for determination of exceptions in multi-dimensional data, such as multi-dimensional data in an OLAP database. In accordance with the present invention the determination of exceptions relies on multivariate data analysis, and in particular the ANOVA method.

The ANOVA method is as such known from "Applied Multivariate Data Analysis", J. D. Jobson, Springer Verlag, ISBN 0387-97660-4.

There are a number of variants of the ANOVA method, such as ANOVA based on a linear model and based on a log-linear model.

The application of the log-linear ANOVA method provides good results, but is only applicable for positive data values, whereas the linear ANOVA method has no restrictions as far as the data value range is concerned and can also be employed for negative data values, but has an inferior accuracy.

In a preferred embodiment of the invention, the multidimensional data is transformed by means of a variance stabilization transformation prior to the application of an ANOVA method. For example, this can be accomplished by applying a non-linear transformation function having a larger slope for small data values and a lesser slope for large data values to accomplish a weighting function.

After the transformation, preferably a linear ANOVA based method is applied in order to determine exceptions. This results in a method providing highly accurate results without a limitation as to the range of data values. In particular, the method can also be employed for negative data values.

It is a further advantage of the invention that it enables a user to determine an exception within a user specified aggregate level. This enables the user to get answers for business questions related to the selected sub-cube of the OLAP database as defined by the user.

BRIEF DESCRIPTION OF THE DRAWINGS

In the following a preferred embodiment of the invention is explained in greater detail with respect to the drawings in which:

FIG. 3 shows an example of a cube of an OLAP data base;

FIG. 4 shows an example for an exception list;

FIG. 5 shows an example for an exception in the context of an OLAP cube;

FIG. 6 shows a further example in the context of an OLAP cube; and

FIG. 7 shows an example for an exception for a user defined aggregate level.

DESCRIPTION OF THE PREFERRED EMBODIMENT

Figure 1:
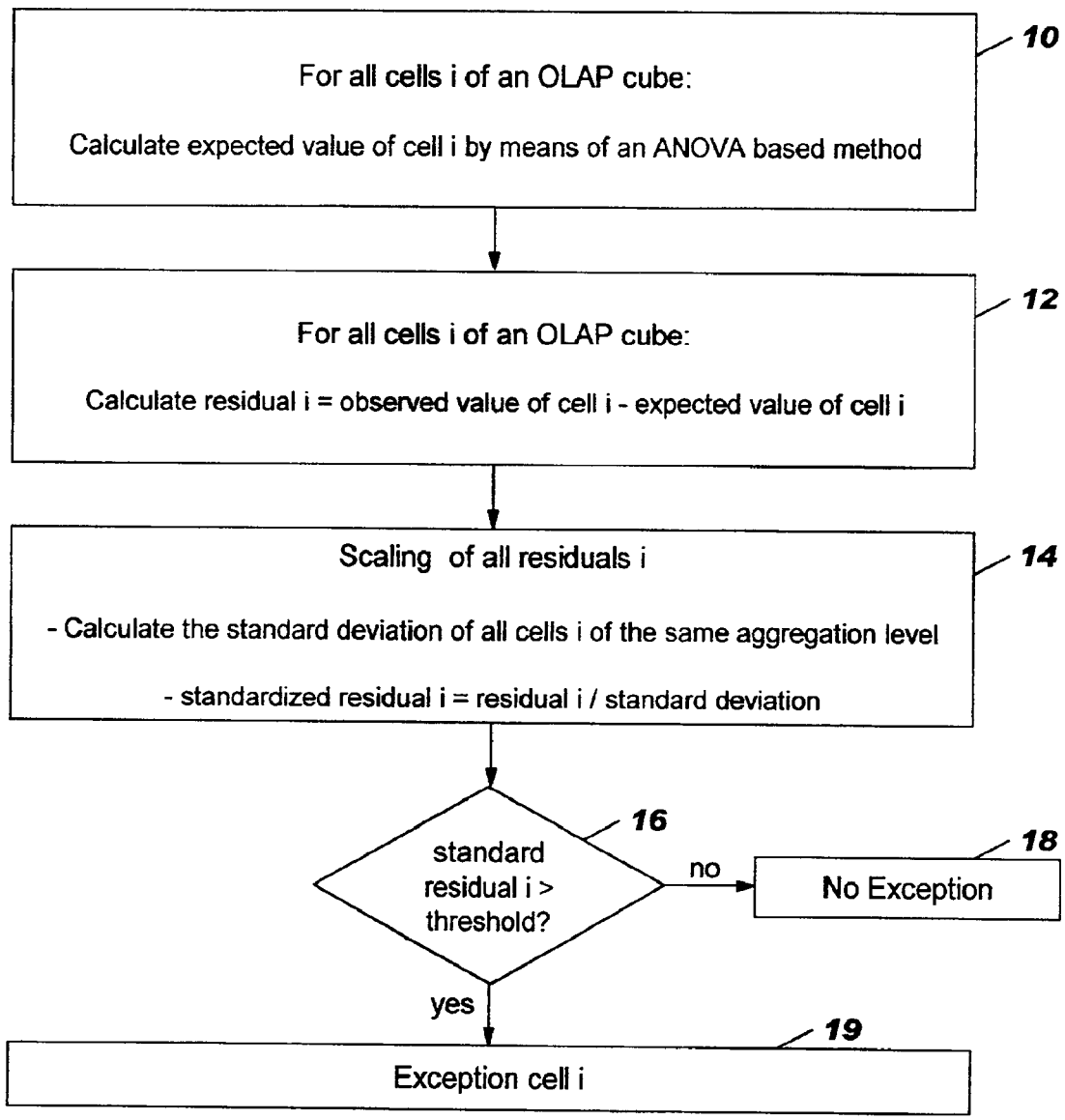
FIG. 1 is illustrative of a first embodiment of a method in accordance with the invention.

FIG. 1 shows a first embodiment for finding an exception in multi-dimensional data stored in an OLAP data base. In Step 10, an expected value is calculated for all cells within a given OLAP cube. The expected values are calculated by means of an ANOVA based method. A variety of ANOVA based methods for calculation of the expected values is explained in greater detail in the mathematical appendix.

In Step 12, the residuals are calculated for all cells of the OLAP cube. This is done by determining the difference between the actual observed data value of a cell i and the corresponding expected value as determined in Step 10.

In Step 14, the residuals determined in Step 12 are scaled. This is done by calculating the standard deviation of the residuals from all cells comprised within the same aggregation level. The residual i of a cell i of this aggregation level is standardized by dividing the residual i as determined in Step 12 by the standard deviation of residuals for that aggregation level.

In Step 16, it is decided whether the standardized residual i is greater than a threshold value. If this is not the case, this means that the corresponding cell i does not contain an exception (Step 18). If the contrary is the case, an output operation is performed in Step 19 to highlight the exception to a user. Step 16 is performed with respect to all cells i in order to find exception within the cells i.

For example, a threshold value of 2.5 is an advantageous choice but other threshold values can be chosen depending on the application. If a higher threshold value is chosen for Step 16, only the strongest exceptions are identified as exceptions.

Figure 2:
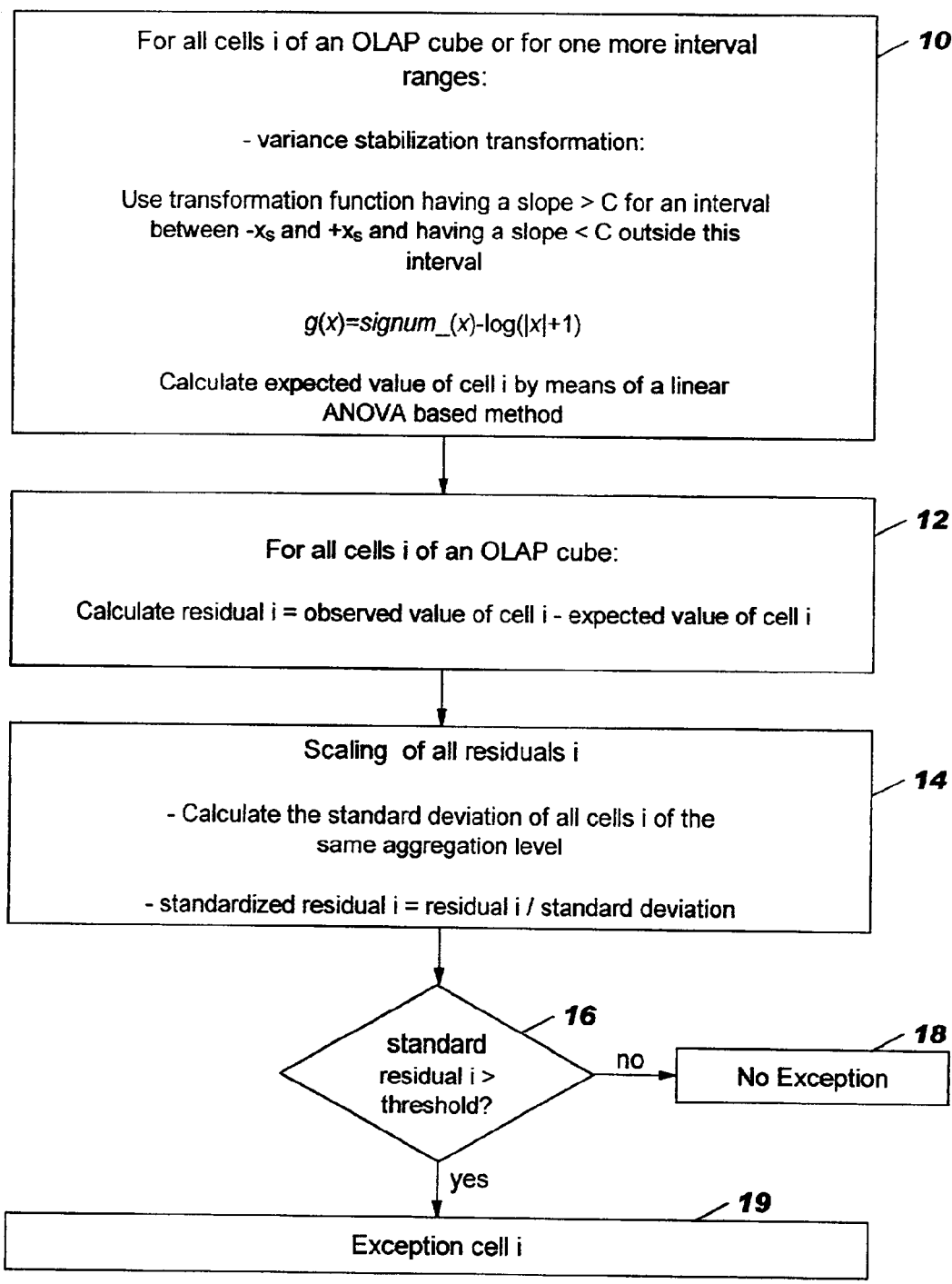
FIG. 2 is illustrative of a second embodiment of a method in accordance with the invention.

FIG. 2 shows an alternative embodiment of the method of FIG. 1. In Step 11 a variance stabilization transformation is carried out for a transformation of data values of all cells i of a given OLAP cube or only a sub-set of the cells, depending on a user's choice. For example, a user can chose one or more interval ranges of cells to be transformed. In this case, the other cells are ignored for the further processing.

In essence, the variance stabilization transformation serves to limit the weight of large data values. This can be done by means of a non-linear transformation function having a slope greater than a constant C for an interval between a lower value $-x_s$ and an upper boundary value $+x_s$ and having a slope lesser than the constant C outside this interval. An example for a function fulfilling these requirements is the function $g(x)$ as shown in Step 11 of FIG. 2. This function is symmetrical and has an unlimited data range for the argument x also spanning negative values for x.

The expected values for the cells are calculated by means of a linear ANOVA based method similar to Step 10 of FIG. 1.

The consecutive Steps 12 to 19 of FIG. 2 correspond to the consecutive Steps 12 to 19 of FIG. 1.

It is to be noted that the variance stabilization transformation is advantageous in that it provides results for the determination of an exception which are accurate and at the same time are not limited as far as the data range is concerned.

A comparison of the three ANOVA based approaches, (linear model, log-linear model and linear model with variance stabilization transformation) shows the advantages of the different models. For comparison of the three approaches, reference is made to the exemplary cube 1 of FIG. 3 of an OLAP data base. The cube 1 only contains positive cell values for purposes of the comparison, because the log-linear model is restricted to positive values.

The cube 1 is two dimensional. All cell values are equal to 2 with two exceptions. In one row, all cell values are 800 except for a single cell of this row, which has the value 2. In a second row, the cube 1 contains one cell with a value of 9900. The cube has no aggregation levels.

The linear ANOVA model approach identifies only the 9900 cell as an exception. The log-linear model as well as the linear model with variance stabilization transformation identify the 9900 cell and the cell having the value of 2 within the 800 row ( . . . , 800, 2, 800, . . . ) as exceptional. This example shows the drawbacks of the linear model approach without prior variance stabilization transformation where the extreme value of the exceptional cell 9900 hides all other exceptions.

FIG. 4 is illustrative of an application of the present invention to the field of banking. An OLAP cube out of the banking data area is selected in order to identify an exception. a The banking cube consists of the dimensions Scenario, Product, Business Unit, Individual Age Group, Customer Relationship, Customer Annual Income and Time Period. The Scenario "Actual" and the measure Profit are selected. FIG. 4 shows the result of an examination run in accordance with the present invention which contains an exception list ranked in a descending order. The right most column of the table of FIG. 4 shows the magnitude of the scaled residuals.

FIG. 5 shows an example for an exception in the positive value range. It is to be noted that in the following sections the following definitions for hierarchies and their members are used:

Definition 1: hierarchy name (member name) and

Definition 2: hierarchy name (complete dimension) for complete dimensions.

One of these exceptions is selected and the result is shown in the context of an OLAP cube in FIG. 5. The exception 252.99 in MARCH 1999 in the north region for the scenario "Actual", the product "Regular Checking", the individual age group "31 to 45", customer relationship "between 5 and 10 years", the customer annual income "under $20,000" is highlighted.

Figures 3, 6, 7:
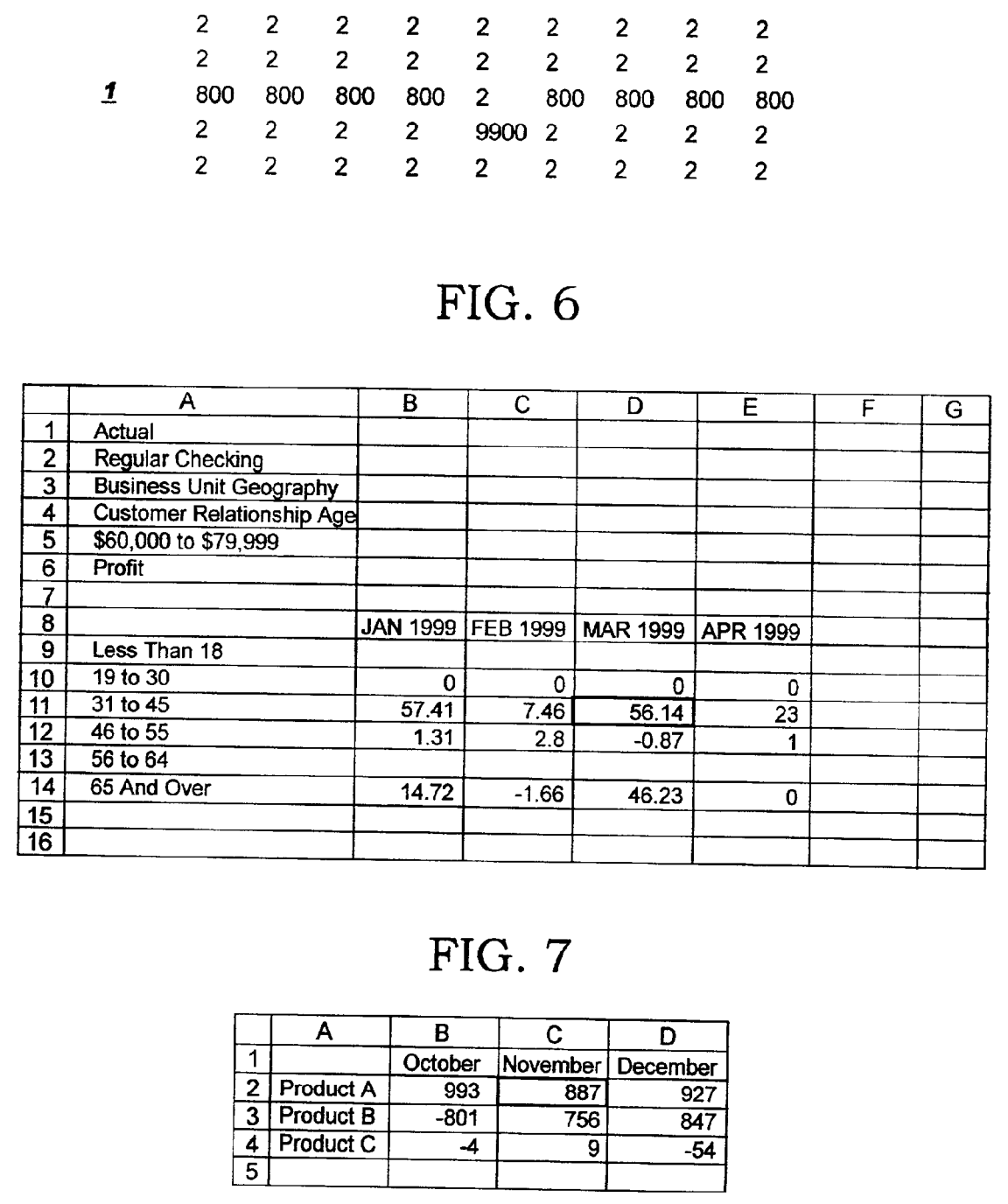

FIG. 6 shows an example for an exception in the positive and negative value ranges. Again, one of these exceptions is selected and the result is shown in the context of the OLAP cube. As a result, there is an exception with a negative cell value −56.14 in MARCH 1999 in the Individual Age Group "31 to 45" for the scenario "actual", the product "Regular Checking", the Business Unit Geography "complete dimension", the Individual Age Group "31 to 45", customer relationship "complete dimension", the customer annual income "$60,000 to $79,999". Further, there is an exception at the same slice of the OLAP cube in the positive value range for the individual age group "65 and over" with the cell value 46.23 in column D, line 14 of FIG. 6.

It is most noticeable that the present invention enables the calculation of the standard deviations taking into account all selected cells in the same aggregation level of the OLAP cube. This type of calculation enables providing answers to business questions related to the user selected sub-cubes.

In the following, it is assumed that a user has the following two business questions with respect to the same OLAP cube:

1. Is there an exception, if the profits of three products (A, B, C) in the last quarter (October, November, December) are compared?

2. Is there an exception, if the profits of the three products (A, B, C) are compared for all quarters?

The result for the second question is shown in FIG. 7. Six deviations in columns C, D, lines 2, 3 and 4 are identified.

However no exceptions are identified for the first business question. It is to be noted that the same cells which deliver six deviations with respect to the second question do not show any exception in the first scenario.

In general terms, exception or deviation detection aims to identify a singular real world pattern by using highly sophisticated models to describe the real world behavior. Because of many dependencies, the real world behavior is often so complex that a deviation detection algorithm can only describe a sub-set of this behavior. Therefore, it is important to understand which type of pattern can be identified by using a certain type of model. The more patterns that can be identified, the more a certain method satisfies the customer needs. In accordance with the present invention, a list of patterns is given in the following by way of example.

1. Exceptions on level 0 zero data which is the lowest aggregation level.

2. Exceptions in positive and negative value ranges (in this case, a variance stabilization transformation is used).
3. Exceptions in data where the range of the existing values is very broad. Again, a variance stabilization transformation is used. Because of the weighting, higher values do not overrule or "cover" smaller values.
4. Exceptions of time series patterns where the variance trespass the standard variation of the residuals.
5. Exceptions of aggregation levels which are based on exceptions on lower aggregation levels.
6. Exceptions which only occur on aggregation levels where the level 0 data do not show any exception.
7. Exceptions which are dependent on the selected sub-cube. When the sub-cube is changed the associated exceptions change as well because the related business questions were also changed.

In particular, the patterns 5 and 6 are very significant with respect to the multi-dimensional approach. One of the most important functions of a multi-dimensional data representation are the dynamic aggregations of these data. Therefore, it is highly desirable for any method for finding deviations/exceptions that it is able to support at least pattern 5 and/or preferably also pattern 6.

Further, it is to be noted that instead of using a single variance stabilization transformation for all data, partial transformations can be used for various interval ranges of the data values. For example, a customer might be interested only in its negative appropriate measures. In this case, the transformation function transforms the positive profits to 0.

Further, a customer might be interested only in profit measures which are in the range between 1000 and 2000. Therefore, all values outside this interval are treated either as missing or will be transformed to a certain constant K, where K can be the mean of the interval between 1000 and 2000 or any other constant number.

Further, a customer might be interested in multiple intervals. In this case, the values outside of these intervals are treated as mentioned above.

As a further example a customer might be interested in multiple intervals, where each interval is transformed by means of a separate variance stabilization transformation.

The mathematical analysis used in the present invention will now be described.

Mathematical Appendix

1. The ANOVA based linear model

The two-way linear model for an expected value $\bar{y}_{ijh}$ for a cell in the $i'$th row and the $j'$th column, with an error $\varepsilon$ and $c$ observations is given by $$\bar{y}_{ijh} = \mu + \alpha_j + \beta_i + \varepsilon_{ijh} \text{ with } \begin{array}{l} i = 1, 2, \ldots b; \\ j = 1, 2, \ldots, g; \\ h = 1, 2, \ldots, c. \end{array} \quad \text{(eq. 1)}$$

where $\mu$ denotes the true average over all cells.
Introduce the following constraints $$\sum_{i=1}^{b} \beta_i = \sum_{j=1}^{g} \alpha_j = 0 \quad \text{(eq. 2)}$$

and the model can be written as $$\bar{y}_{ijh} = \mu_{ij} + \varepsilon_{ijh} \text{ with } \begin{array}{l} i = 1, 2, \ldots b; \\ j = 1, 2, \ldots, g; \\ h = 1, 2, \ldots, c. \end{array} \quad \text{(eq. 3)}$$

Assume the number of observations $c = 1$ $$\mu_{ij} = \mu + \alpha_j + \beta_i$$
$$\alpha_j = \mu_{\cdot j} - \mu$$
$$\beta_i = \mu_{i \cdot} - \mu$$

and hence
$\mu_{ij} = \mu + (\mu_{\cdot j} - \mu) + (\mu_{i \cdot} - \mu)$. This results in $$\mu_{ij} = \mu_{\cdot j} + \mu_{i \cdot} - \mu \quad \text{(eq. 4)}$$

there the expected value $\bar{y}_{ij}$ is expressed as sum of
- $\mu_{i \cdot}$ = mean of the cells in the $i'$th row
- $\mu_{\cdot j}$ = mean of the cells in the $j'$th column
- minus $\mu$ = overall mean of all cells This approach can be enhanced for three-way, four-way and n-way models.

This ANOVA based approach can be adapted to OLAP cubes. For an observed value $y_{i_1 \ldots i_n}$ in a Cube $G$ at position $i_p$ of the $p'$th dimension $\delta_p$ the expected value $\bar{y}_{i_1 \ldots i_n}$ is defined as function for the various aggregation levels with $g = 2^n - 1$ as:

$$\bar{y}_{i_1 i_2 \ldots i_n} = \sum_{G \subset \{\delta_1 \ldots \delta_n\}} \mu^G_{(i_p, i_p, \ldots i_r)} \qquad \text{(eq. 5)}$$

Let us consider a cube with three dimension A,B,C. For the expected value $\bar{y}_{ijk}$ for the $i'th$ member of dimension A, the $j'th$ member of dimension B and the $k'th$ member of dimension C we get $$\bar{y}_{ijk} = \mu + \mu^A_i + \mu^B_j + \mu^C_k + \mu^{AB}_{ij} + \mu^{BC}_{jk} + \mu^{AC}_{ik} \qquad \text{(eq. 6)}$$

With the ANOVA approach we get:

- $\mu = \mu_{\ldots} =$ overall mean of all cells of a certain aggregation level where $\mu_{i_1 i_2 \ldots i_n} = y_{i_1 i_2 \ldots i_n}$.
- $(\mu)^{A_p}_{i_p} = \mu_{\ldots i_p \ldots} - \mu$ , where $\mu_{\ldots i_p \ldots}$ is the mean for the $p'th$ hierarchy in the $\delta_p$ dimension.
- $(\mu)^{A_p A_q}_{i_p i_q} = \mu_{\ldots i_p \ldots i_q \ldots} - (\mu)^{A_p}_{i_p} - (\mu)^{A_q}_{i_q} - \mu$ , where $\mu_{\ldots i_p \ldots i_q \ldots}$ is the mean for the $p'th$ member in the $\delta_p$ dimension and the $q'th$ member in the $\delta_q$ dimension.

The difference between the expected Value $\bar{y}_{i_1 i_2 \ldots i_n}$ and the observed value $y_{i_1 i_2 \ldots i_n}$ is called residual $r_{i_1 i_2 \ldots i_n}$. The residuals between the actual and expected values are used to measure the significance of being exceptional. The larger the difference of the expected and the actual value is, the larger is the significance to be exceptional. Scaling problems are avoided by introducing the standardized residual $s_{i_1 i_2 \ldots i_n}$ with the standard deviation $\sigma_{i_1 i_2 \ldots i_n}$ as scaling factor.

as $\quad s_{i_1 i_2 \ldots i_n} = \left[ \dfrac{|y_{i_1 i_2 \ldots i_n} - \bar{y}_{i_1 i_2 \ldots i_n}|}{\sigma_{i_1 i_2 \ldots i_n}} \right] \qquad$ (eq. 7)

A cell value is exceptional if it's standardized residual is greater than a certain significance threshold value.

2. The ANOVA based log-linear model

The ANOVA based log-linear approach can be adapted to OLAP cubes. For a observed value $y_{i_1 i_2 \ldots i_n}$ in a Cube $G$ at position $i_p$ of the $p'th$ dimension $\delta_p$ the expected value $\bar{y}_{i_1 i_2 \ldots i_n}$ is defined as function for the various aggregation levels $g = 2^n - 1$ as:

$$\bar{y}_{i_1 i_2 \ldots i_n} = \prod_{G \subset \{\delta_1, \delta_2, \ldots, \delta_n\}}^{g} \mu^G_{(i_p, \forall_p \in G)} \quad \text{(e.q. 8)}$$

Which can be transformed in a linear form using the log function $$\log(\bar{y}_{i_1 i_2 \ldots i_n}) = \sum_{G \subset \{\delta_1, \delta_2, \ldots, \delta_n\}}^{g} \mu^G_{(i_p, \forall_p \in G)} \quad \text{(eq. 8.1)}$$

Please note that we use here the logarithm of the $\mu$'s.
Let us consider a cube with three dimension A,B,C. For the expected value $\bar{y}_{ijk}$ for the $i'th$ member of dimension A, the $j'th$ member of dimension B and the $k'th$ member of dimension C we get $$\log(\bar{y}_{ijk}) = \mu + \mu_i^A + \mu_j^B + \mu_k^C + \mu_{ij}^{AB} + \mu_{jk}^{BC} + \mu_{ik}^{AC} \quad \text{(eq. 9)}$$

With the ANOVA approach we get:

- $\mu = \mu_{\ldots} =$ overall mean of all cells of a certain aggregation level where $\mu_{i_1 i_2 \ldots i_n} = \log(y_{i_1 i_2 \ldots i_n})$

- $(\mu)_{i_p}^{A_p} = \mu_{\ldots i_p \ldots} - \mu$ , where $\mu_{\ldots i_p \ldots}$ is the mean for the $p'th$ hierarchy in the $\delta_p$ dimension.

- $(\mu)_{i_p i_q}^{A_p A_q} = \mu_{\ldots i_p \ldots i_q \ldots} - (\mu)_{i_p}^{A_p} - (\mu)_{i_q}^{A_q} - \mu$ , where $\mu_{\ldots i_p \ldots i_q \ldots}$ is the mean for the $p'th$ member in the $\delta_p$ dimension and the $q'th$ member in the $\delta_q$ dimension.

3. Variance stabilization transformation g(x) prior of application of ANOVA medhod For an observed value $y_{i_1 i_2 \ldots i_n}$ in a Cube Z at position $i_p$ of the $p'th$ dimension $\delta_p$ the expected value $\bar{y}_{i_1 i_2 \ldots i_n}$ is defined by the following function for the various aggregation levels:

$$\bar{z}_{i_1 i_2 \ldots i_n} = \sum_{G \subset (\delta_1, \delta_2, \ldots \delta_n)} \gamma^G_{(i_p, \delta_p \in G)} \qquad (eq.\ 10)$$

where $\bar{z}_{i_1 i_2 \ldots i_n}$ is a transformed value of the expected value $\bar{y}_{i_1 i_2 \ldots i_n}$ such that $\bar{z}_{i_1 i_2 \ldots i_n} = SIGNUM(\bar{y}_{i_1 i_2 \ldots i_n}) * \log(|\bar{y}_{i_1 i_2 \ldots i_n}| + 1)$. (eq. 10.b)

The expected value is defined as $$\bar{y}_{i_1 i_2 \ldots i_n} = SIGNUM(\bar{z}_{i_1 i_2 \ldots i_n})(e^{(|\bar{z}_{i_1 i_2 \ldots i_n}|)} - 1). \qquad (eq.11)$$

Let us consider a cube with three dimension A,B,C. For the expected value $\bar{z}_{ijk}$ for the $i'th$ member of dimension A, the $j'th$ member of dimension B and the $k'th$ member of dimension C we get $$\bar{z}_{ijk} = \mu + \mu^A_i + \mu^B_j + \mu^C_k + \mu^{AB}_{ij} + \mu^{BC}_{jk} + \mu^{AC}_{ik} \qquad (eq.\ 12)$$

With the new approach we get:

- $\mu = \mu_{\ldots} =$ overall mean of all cells of a certain aggregation level where $\mu_{i_1 i_2 \ldots i_n} = z_{i_1 i_2 \ldots i_n}$ with $z_{i_1 i_2 \ldots i_n} = SIGNUM(y_{i_1 i_2 \ldots i_n}) * \log(|y_{i_1 i_2 \ldots i_n}| + 1)$

- $(\mu)^{A_p}_{i_p} = \mu_{\ldots i_p \ldots} - \mu$ , where $\mu_{\ldots i_p \ldots}$ is the mean for the $p'th$ hierarchy in the $\delta_p$ dimension.

- $(\mu)^{A_p A_q}_{i_p i_q} = \mu_{\ldots i_p \ldots i_q \ldots} - (\mu)^{A_p}_{i_p} - (\mu)^{A_q}_{i_q} - \mu$ , where $\mu_{\ldots i_p \ldots i_q \ldots}$ is the mean for the $p'th$ member in the $\delta_p$ dimension and the $q'th$ member in the $\delta_q$ dimension.

The difference between the expected Value $\bar{z}_{i_1 i_2 \ldots i_n}$ and the observed value $z_{i_1 i_2 \ldots i_n}$ is called residual $r_{i_1 i_2 \ldots i_n}$. The residuals between the actual and expected values are used to measure the significance for a cell to be exceptional. The standardized residual $s_{i_1 i_2 \ldots i_n}$ is defined to be a multiple of the associated standard deviation $\sigma_{i_1 i_2 \ldots i_n}$ $$s_{i_1 i_2 \ldots i_n} = \left[ \frac{|z_{i_1 i_2 \ldots i_n} - \bar{z}_{i_1 i_2 \ldots i_n}|}{\sigma_{i_1 i_2 \ldots i_n}} \right] \qquad (eq.\ 13)$$

The associated standard deviation $\sigma_{i_1 i_2 \ldots i_n}$ is defined as the square root from the sum of all squared residuals which belong to the same level of the OLAP cube where the transformed cell $r_{i_1,i_2,...i_n}$ exists, divided by the number of cells within this aggregation level.

A cell value is exceptional if it's standardized residual is greater than a certain significance threshold value.

What is claimed is:

1. A method for determination of an exception in multi-dimensional data, the method comprising the steps of:
   a) determining an expected value for a set of cells of the multi-dimensional data by means of an ANOVA based method;
   b) determining a residual for each cell of the set of cells;
   c) scaling the residuals; and
   d) comparing the scaled residuals with a threshold value for determination of the exception.

2. The method of claim 1, wherein the multi-dimensional data is stored in an OLAP data base.

3. The method of claim 1, further comprising the step of performing a variance stabilization transformation prior to said comparing step.

4. The method of claim 3, wherein the variance stabilization transformation comprises a non-linear transformation function.

5. The method of claim 3, wherein the variance stabilization transformation comprises reducing weight of large absolute data values with respect to low absolute data values of the multi-dimensional data.

6. The method of claim 3, wherein the variance stabilization transformation comprises a transformation function having a slope greater than a constant for a data interval comprising 0 and having a slope lesser than the constant outside the data interval.

7. The method of claim 3, wherein the variance stabilization transformation is performed with respect to all data values or a selected sub-set of data values.

8. The method of claim 1, wherein the ANOVA based method is a linear ANOVA based method.

9. The method of claim 1, wherein the residual for each cell is calculated by subtracting an expected value from an observed value of each cell.

10. The method of claims 1, wherein said scaling step further comprises calculating the standard deviation of the residuals from all cells of a same aggregation level and standardizing the residual of the same aggregation level by dividing the residual by the associated standard deviation.

11. The method of claim 10, wherein the exception is determined within the same aggregation level.

12. The method of claim 11, wherein the aggregation level is user specified.

13. A computer program product stored on a computer usable medium comprising computer readable program means for determination of an exception in multi-dimensional data, said computer program product comprising:
   first subprocesses for determining an expected value for a set of cells of the multi-dimensional data by means of an ANOVA based method,
   second subprocesses for determining a residual for each cell of the set of cells;
   third subprocesses for scaling the residuals; and
   fouth subprocessess for sucomparing the scaled residuals with a threshold value for determination of the exception.

14. A computer system for determination of an exception in multi-dimensional data, said system comprising:
   means for determining an expected value for a set of cells of the multi-dimensional data by means of an ANOVA based method;
   means for determining a residual for each cell of the set of cells;
   means for scaling the residuals; and
   means for comparing the scaled residuals with a threshold value for determination of the exception.

* * * * *

UNITED STATES PATENT AND TRADEMARK OFFICE
CERTIFICATE OF CORRECTION

PATENT NO. : 6,892,209 B2
DATED : May 10, 2005
INVENTOR(S) : Martin Keller et al.

It is certified that error appears in the above-identified patent and that said Letters Patent is hereby corrected as shown below:

Title page,
Insert Item -- [30] Foreign Priority Application Data
June 13, 2001 (EP)...............................01114287.4 --.

Signed and Sealed this

Thirty-first Day of January, 2006

JON W. DUDAS
*Director of the United States Patent and Trademark Office*